United States Patent
Koppolu et al.

(10) Patent No.: US 9,531,695 B2
(45) Date of Patent: Dec. 27, 2016

(54) ACCESS CONTROL TO SECURED APPLICATION FEATURES USING CLIENT TRUST LEVELS

(75) Inventors: Lokesh Srinivas Koppolu, Redmond, WA (US); Amritansh Raghav, Seattle, WA (US); Anton W. Krantz, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 674 days.

(21) Appl. No.: 12/483,239

(22) Filed: Jun. 12, 2009

(65) Prior Publication Data

US 2010/0319063 A1 Dec. 16, 2010

(51) Int. Cl.
*G06F 15/16* (2006.01)
*H04L 29/06* (2006.01)
(Continued)

(52) U.S. Cl.
CPC ............... *H04L 63/08* (2013.01); *G06F 21/33* (2013.01); *H04L 63/105* (2013.01);
(Continued)

(58) Field of Classification Search
CPC .... H04L 63/105; H04L 63/1073; H04L 63/08; H04L 21/33; H04L 21/50; G06F 21/33; G06F 21/50
See application file for complete search history.

(56) References Cited

U.S. PATENT DOCUMENTS 6,044,264 A * 3/2000 Huotari et al. ............ 455/414.1
6,229,883 B1 * 5/2001 Kakizaki et al. ......... 379/142.04
(Continued)

FOREIGN PATENT DOCUMENTS

AU    WO 9303585 A1 *  2/1993 ............ H04W 8/186
AU    2010258680 B2    5/2014
(Continued)

OTHER PUBLICATIONS

Salsano, et al., "SIP Security Issues: The Sip Authentication Procedure and its Processing Load", retrieved at <<http://ieeexplore.ieee.org/Xplore/login.jsp?url=http%3A%2F%2Fieeexplore.ieee.org%2Fiel5%2F65%2F23365%2F01081764.pdf%3Farnumber%3D1081764&authDecision=-203>>, IEEE, Nov.-Dec. 2002, pp. 38-44.
(Continued)

*Primary Examiner* — Krista Zele
*Assistant Examiner* — Anthony Fabbri
(74) *Attorney, Agent, or Firm* — Monica Adjemian; Tom Wong; Micky Minhas

(57) ABSTRACT

Architecture that facilitates the conveyance of a trust level when the caller makes a call, the trust level in dependence on the state of the caller system. The callee (call recipient) receives notification of the trust level and can use this information in the communication such as to request verification from the caller and/or initiate other modes of communication. A caller can authenticate the caller identity in different ways to a communication server. Based on that, the server can assign an appropriate server-verified trust level to the caller. Further, an unsecured phone controller can indicate a lower client-side defined trust level. The server verified and client-side trust levels are then sent to the callee, where the callee determines whether to allow caller access to one or more secured features based on the feature values and the trust level imposed by the callee to access those features.

15 Claims, 9 Drawing Sheets

(51) Int. Cl.
   *G06F 21/33*      (2013.01)
   *G06F 21/50*      (2013.01)
(52) U.S. Cl.
   CPC ...... *H04L 65/1006* (2013.01); *H04L 65/1073* (2013.01); *G06F 21/50* (2013.01)

(56) References Cited

U.S. PATENT DOCUMENTS

| | | | |
|---|---|---|---|
| 6,691,232 B1* | 2/2004 | Wood | H04L 63/0815 726/18 |
| 6,892,307 B1* | 5/2005 | Wood et al. | 726/8 |
| 7,069,252 B2 | 6/2006 | Ishimi et al. | |
| 7,103,172 B2* | 9/2006 | Brown et al. | 379/266.01 |
| 7,167,551 B2* | 1/2007 | Brown et al. | 379/201.07 |
| 7,227,942 B2* | 6/2007 | Deo et al. | 379/219 |
| 7,284,124 B1* | 10/2007 | Ginsberg | 713/167 |
| 7,486,622 B2* | 2/2009 | Regan et al. | 370/236 |
| 2002/0035685 A1* | 3/2002 | Ono et al. | 713/155 |
| 2003/0140011 A1* | 7/2003 | Ishimi et al. | 705/76 |
| 2004/0073621 A1* | 4/2004 | Sampson | G06F 17/30067 709/209 |
| 2006/0236097 A1* | 10/2006 | Prologo et al. | 713/156 |
| 2007/0162963 A1* | 7/2007 | Penet et al. | 726/5 |
| 2009/0077616 A1* | 3/2009 | Lindholm | H04L 63/20 726/1 |
| 2009/0103524 A1* | 4/2009 | Mantripragada et al. | 370/352 |

FOREIGN PATENT DOCUMENTS

| | | | |
|---|---|---|---|
| CN | 1440535 | 9/2003 | |
| CN | 1440535 A | 9/2003 | |
| WO | 9857514 A1 | 12/1998 | |
| WO | WO 2007/115209 A2 * | 10/2007 | |
| WO | WO2007115209 | 10/2007 | |
| WO | WO2008024135 | 2/2008 | |
| WO | WO2008030629 | 3/2008 | |
| WO | WO 2008030629 A1 * | 3/2008 | H04L 45/60 |
| WO | WO2010144737 | 12/2010 | |

OTHER PUBLICATIONS

"Intelligent Network Services: The Underlying Power of Unified Communications Applications", retrieved at <<http://www.cisco.com/web/strategy/docs/gov/SONA_UC_Aug07.pdf>>, pp. 1-3.
International Search Report, Mailed Date: Dec. 28, 2010, Application No. PCT/US2010/038220, Filed Date: Jun. 10, 2010, pp. 9.
Kagal, et al., "Moving from Security to Distributed Trust in Ubiquitous Computing Environments", IEEE Computer, Dec. 2001, pp. 1-6.
"Intelligent Network Services: The Underlying Power of Unified Communications Applications", Jul. 18, 2008, retrieved at <<http://www.cisco.com/web/strategy/docs/gov/SONA_UC_Aug07.pdf, pp. 1-3, Submitted Jun. 12, 2009.
Australian Official Action dated Feb. 4, 2014 in Australian Application No. 2010258680.
Chinese Official Action dated Aug. 7, 2014 in Chinese Application No. 201080026395.2.
Extended European Search Report mailed Mar. 18, 2015 for European Patent Application No. 10786866.3, 7 pages.
Russian Notice of Allowance dated Sep. 22, 2014 in Russian Application No. 2011150225.
Second Chinese Office Action mailed Apr. 29, 2015 for Chinese patent application No. 201080026395.2, a counterpart foreign application of U.S. Appl. No. 12/483,239, 7 pages.
First Chinese Office Action mailed Aug. 7, 2014 from Chinese Patent Application No. 201080026395.2; 13 pages.
Korean Office Action mailed Jun. 1, 2016 for Korean Patent Application No. 10-2011-7029337, a counterpart foreign application of U.S. Appl. No. 12/483,239.
Translated Israeli Office Action mailed Nov. 10, 2015 for Israeli Patent Application 216210, a counterpart foreign application of U.S. Appl. No. 12/483,239, 6 pages.
"Office Action and Search Report Issued in Malaysian Patent Application No. PI 2011005775," Mailed Date: Jul. 29, 2016, 3 pages.

* cited by examiner

ACCESS CONTROL TO SECURED APPLICATION FEATURES USING CLIENT TRUST LEVELS

BACKGROUND

Voice communications can be performed between many different types of endpoints and endpoint systems. One communications framework approach enables the use of software-powered telephony, which is a change in paradigm from traditional PBX (private branch exchange) telephony solutions. The user identity is used for all modes of communications and, the telephony components can be provided by the computing system, voice peripherals, and/or dedicated IP phones. This differs from existing PBX solutions that pre-provision a telephone which is not directly tied to a user identity and is not authenticated to a communications server. In a PBX system, the caller ID is tied to a phone that physically connects to that phone line. In a broader sense, this also applies to voice and other modality communications such as instant messaging, data collaboration, etc.

In a unified communications (UC) architecture where some or all forms of communications are integrated, provisioning can be initiated from a UC client that is connected to the Internet, for example, and which can authenticate with a UC server. While enabling greater flexibility in communications, the approach does require greater trust in the user identity, for example, when the receiving party receives caller identification as part of an incoming call. It is possible for a third party to access a user phone or peripheral when unattended and place a call, as is the case with PBX solutions today. Consequently, with existing solutions, the receiving party does not know that the call has not been made by the calling party advertised in the caller ID, and thus, may unintentionally disclose information.

While a user obtaining access to the user phone or peripheral is one type of problem, a broader issue can be where a first user enters credentials of a second user on the first user softphone and then masquerades as the second user. This is possible if the second user credentials/password are weak and then hacked by another person. In the PBX world, physical access to the line or phone is required, whereas in the UC architecture, in addition to access to another user's peripheral/phone, the ability to then hack another password poses a security risk.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture facilitates the creation and utilization of trust information level by an endpoint (e.g., caller client) when a caller makes a call, for example. The trust level information can be created as part of registration of the near endpoint to a communications infrastructure (e.g., voice) using near endpoint credentials. Other trust level information can be created by the near endpoint based on the state (e.g., locked or unlocked) of the near endpoint, and used with the registration trust level information to be processed by a far endpoint to determine the exposure of application features to the near endpoint. The far endpoint receives notification of the trust level information and can use this information in the communication such as to request verification from the near endpoint and/or initiate other modes of communication between the endpoints.

In a more specific implementation, a caller from a caller client (e.g., IP phone) can authenticate the caller identity in different ways to a communications registration server. Based thereon, the registration server assigns an appropriate server-verified trust level to the caller client. An unsecured IP phone controller, for example, can indicate a lower client-side defined trust level. The server verified and client-side trust levels are then sent to the callee client where the callee client decides whether to provide the caller client access to one or more secured application features based on the feature values and the trust level information imposed by the callee client to access those features. Additionally, the callee client can pass these security levels to external application servers from which the callee client accesses information for the caller (e.g., human resources database).

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
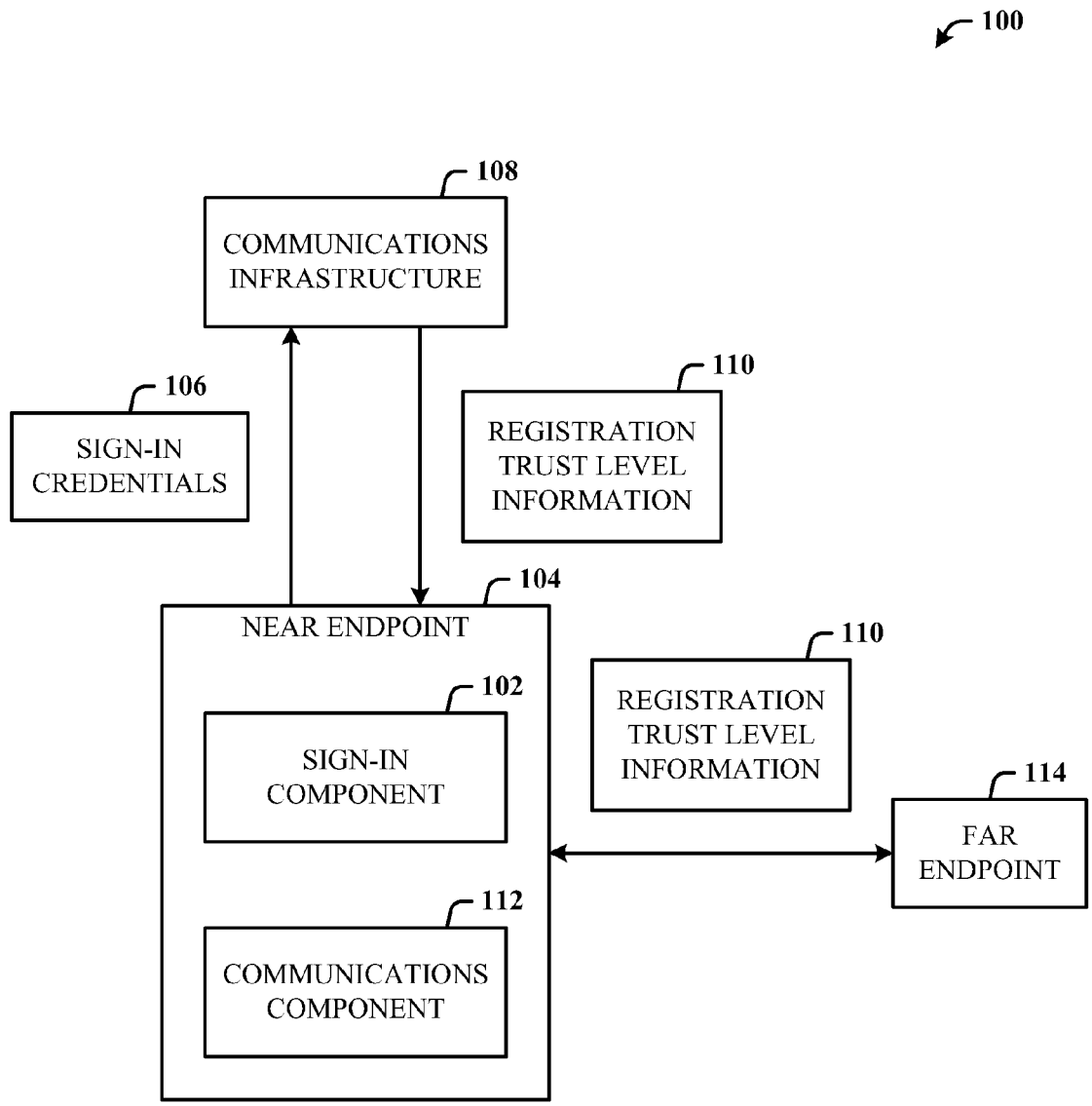
FIG. 1 illustrates a computer-implemented communications security system in accordance with the disclosed architecture.

The disclosed architecture creates and uses trust level information created by a server and a client to determine how interacting clients provide access control to the other or each other. In a one-way example, a caller client sends server-created trusted level information to a callee client. This enables the callee to selectively provide the caller access to secured application features based on the server and client-indicated trust levels.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented communications security system 100 in accordance with the disclosed architecture. The system 100 includes a sign-in component 102 of a near endpoint 104 for sending sign-in credentials 106 for registration to a communications infrastructure 108 and receiving registration trust level information 110 based on the sign-in credentials 106. The near endpoint 104 can also include a communications component 112 for sending the registration trust level information 110 to a far endpoint 114. The far endpoint 114 manages communicative interaction with the near endpoint 104 based on the registration trust level information 110.

The registration trust level information 110 can be signed as part of the registration process. The near endpoint 104 can send the registration trust level information 110 in combination with a call initiated by the near endpoint 104 to the far endpoint 114. For example, the near endpoint 104 can send the trust level information 110 during call initiation, mid-call in response to a request/challenge from the far endpoint 114, or mid-call to change the security level of the near endpoint 104 in anticipation of requiring a higher security level to secure access to application features.

The communications infrastructure 108 can be IP-based, and the near endpoint 104 sends the registration trust level information 110 in combination with an IP call via the IP-based communications infrastructure 108 as session initiation protocol (SIP) messages to the far endpoint 114. It is to be understood that the far endpoint 114 can include the same or similar capabilities (e.g., sign-in component 102 and communications component 112) as the near endpoint 104 to thereby facilitate bi-directional trust level processing.

Figure 2:
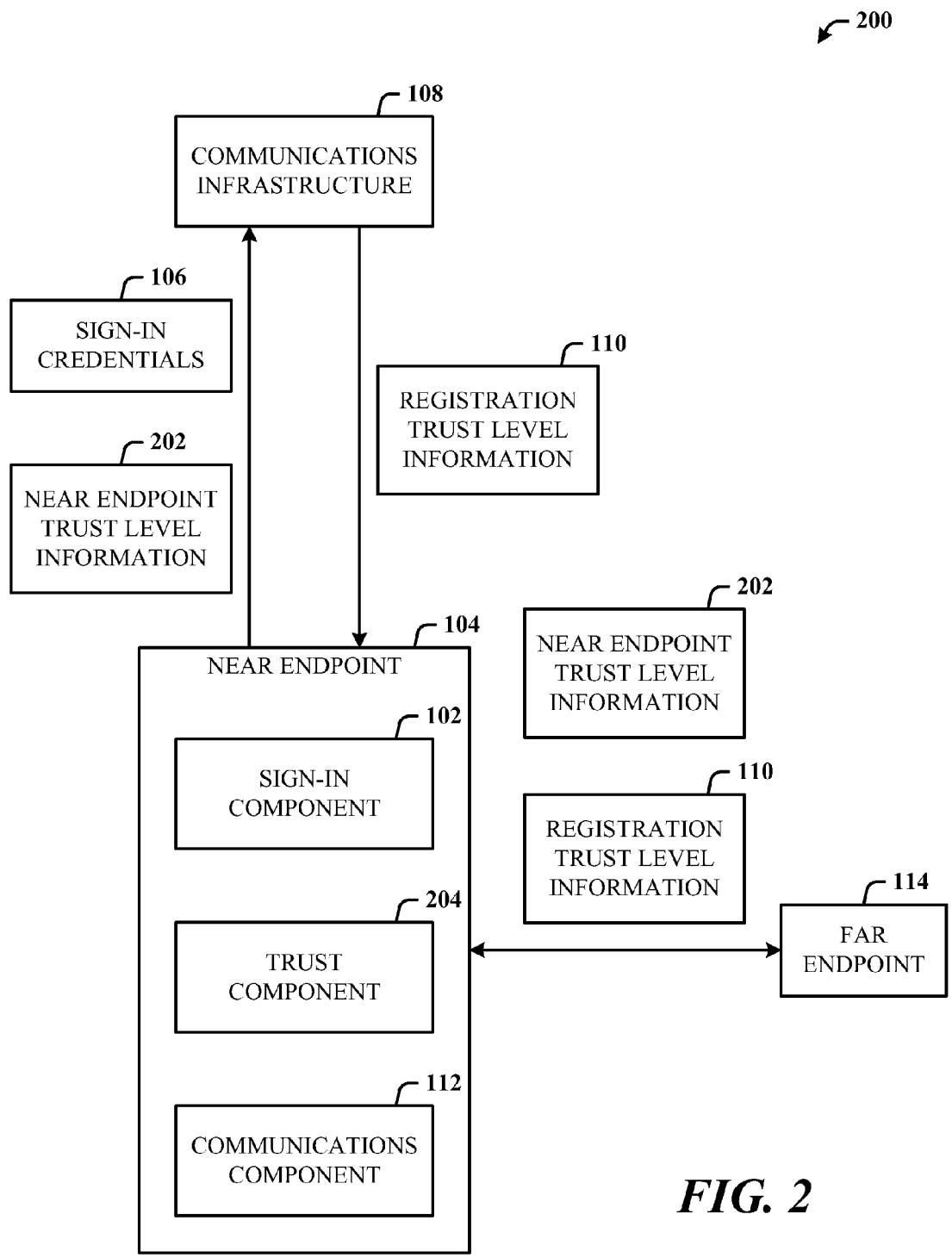
FIG. 2 illustrates an alternative embodiment of communications security system that further provides near endpoint trust level information.

FIG. 2 illustrates an alternative embodiment of communications security system 200 that further provides near endpoint trust level information 202. The system 200 includes the entities, functionality, and components of the system 100 of FIG. 1, with the addition of a near endpoint trust component 204 for computing the near endpoint trust level information 202. The near endpoint trust level information 202 can be sent with the sign-in credentials 106 for registration to the communications infrastructure 108. The registration trust level information 110 is then computed based on the sign-in credentials 106 and/or the near endpoint trust level information 202.

The near endpoint 104 can then send the registration trust level information 110 with or without the near endpoint trust level information 202 to the far endpoint 114. The far endpoint 114 then requests access to features of secured applications based on the registration trust level information 110 with or without the near endpoint trust level information 202.

The near endpoint trust component 204 recomputes the near endpoint trust level information 202 based on a change in access security state to the near endpoint 104, and sends updated near endpoint trust level information to the far endpoint 114 based on the change or update. The near endpoint trust component 204 creates a verify message that designates (indicates) verification results of the near endpoint 104. The near endpoint 104 can receive suggestions (e.g., from the far endpoint 114) as to actions to take that result in a different level (e.g., increased) of the registration trust level information 110 and/or the near endpoint trust level information 202. It is to be understood that the far endpoint 114 can include the same or similar capabilities (e.g., sign-in component 102, near endpoint trust component 204, and communications component 112) as the near endpoint 104; however, this is not a requirement.

Figure 3:
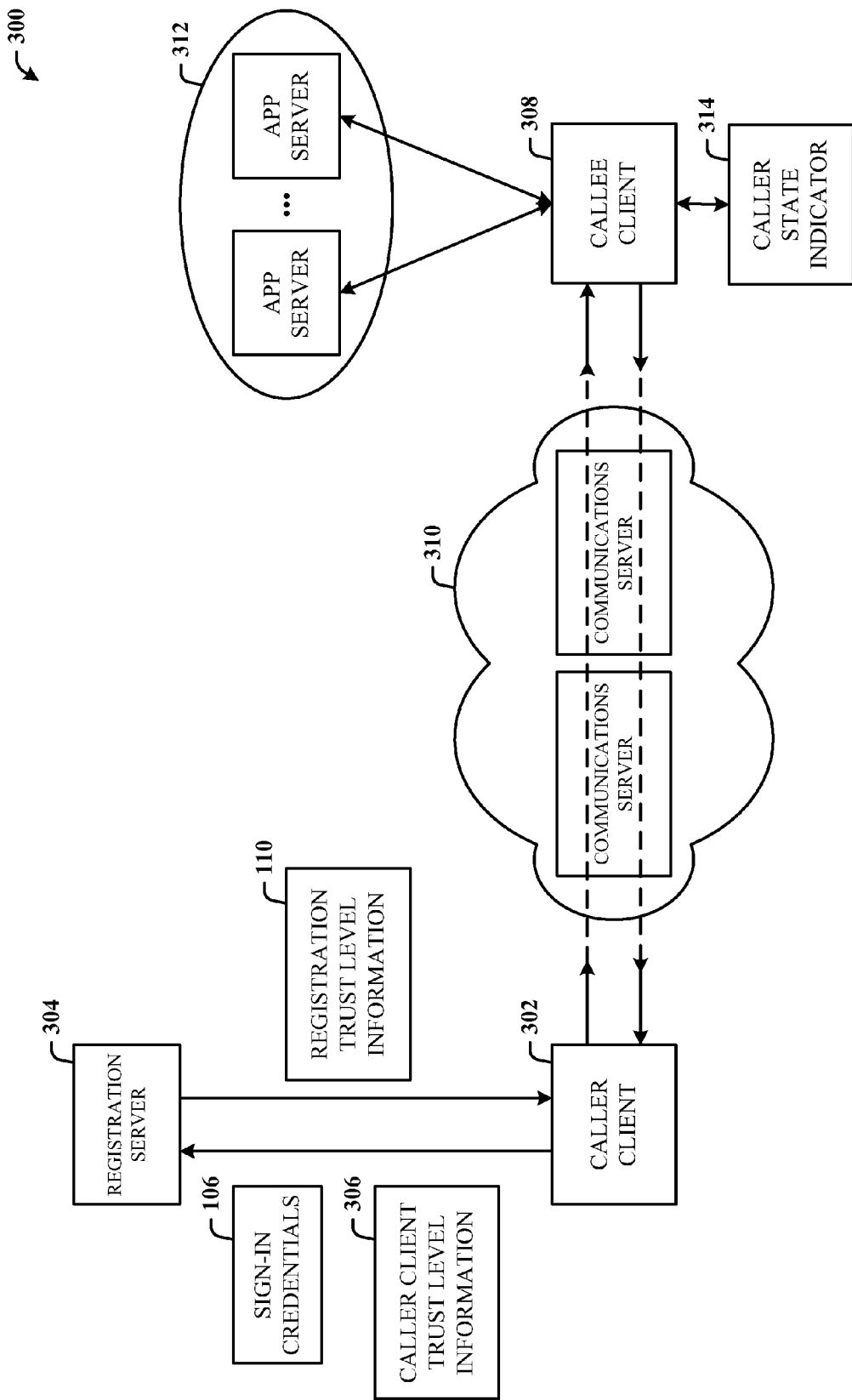
FIG. 3 illustrates a signal flow diagram of trust level information generation and usage.

FIG. 3 illustrates a signal flow diagram 300 of trust level information generation and usage. A caller client 302 (e.g., the near endpoint 104 of FIG. 2) registers with a registration server 304 (as part of the communications infrastructure 108 of FIG. 2) and sends the caller sign-in credentials 106, which can include information as an unauthenticated (e.g., anonymous) user. Optionally, the caller client 302 also sends caller trust level information 306 (similar to near endpoint trust level information 202 of FIG. 2) by setting a SIP client header (e.g., ms-trust-level-client). The registration server 304 then passes a signed token back to the caller client 302, the token indicating the trust level of the caller client 302 in a header in a SIP registration response (e.g., ms-trust-level-registrar).

When the caller client 302 makes an outbound call (e.g., SIP invite) to a callee client 308 (e.g., the far endpoint 114 of FIG. 2), the caller client 302 sends the client trust header (e.g., ms-trust-level-client) and registrar trust header (e.g., ms-trust-level-registrar). The call is placed through one or more communications servers 310. The communication servers 310 can validate the integrity of the signed registration trust level information 110 (e.g., ms-trust-level-registrar header).

The callee client 308 can further pass the trust level information (registration trust level information 110 and caller client trust level information 306) to trusted application servers 312 (e.g., finance, human resources, customer relationship management (CRM), etc.) to request access to application features (the application servers can determine selective access to server components). Once determined to be authorized for access to application features, the callee client 308 exposes the selected features of the application servers 312 to the caller client 302 based on the registration trust level information 110 and/or the caller client trust level information 306.

The disclosed architecture provides ability to integrate authentication of the caller between the client-side IP-phone controller (caller client) and the registration server 304, and the need of callee client 308 to authenticate the caller client 302, especially when the callee client 308 is an automated agent. In addition, the caller client 302 can send the caller client trust level information 306 to both the registration server 304 as well as to the callee client 308. The callee client 308 can selectively enable access to different secured application features based on the server-determined and client-suggested trust levels of the caller client 302.

The caller client 302 registers to the registration server 304 during sign-in. Based on whether the user signs in using strong credentials (e.g., biometrics), less strong credentials (e.g., NTLM—NT LAN Manager™ by Microsoft Corporation), weak credentials (e.g., a personal identification number (PIN)), or the caller signed in anonymously, the registration server 304 determines and generates a trust level, and sends the trust level (registration trust level information 110) to the caller client 302 as a new signed SIP header (e.g., ms-trust-level-registrar).

Further, the caller client 302 can also indicate to the registration server 304 that the caller client 302 is less secure (e.g., if the client 302 is a common area phone) by adding a new (or updated) SIP header (e.g., ms-trust-level-client, where the header is set to value SharedDevice). The registration server 304 then uses this additional updated caller client trust level information in determining the registration trust level information 110 for the caller client 302.

When the caller client 302 makes a call, the caller client 302 adds the signed SIP registrar header (ms-trust-level-registrar) into the SIP invite message, and optionally, the SIP client header (ms-trust-level-client header) as well (e.g., if the device is a common area phone).

Another example where the caller client 302 indicates a lower trust level is when the caller client 302 makes an outbound call from devices attached to a computer (e.g., HID-human interface device, USB peripheral phones, wireless short range devices such as Bluetooth, etc.) even when the computer is locked, or when the call is from a locked desk phone.

The callee client 308 receives an indication of this by setting a lower trust level for calls made when the computer and/or desk phone is locked, setting a medium trust level if the computer and/or desk phone is unlocked with a PIN, or a higher trust level if unlocked using biometrics. For example, the caller client 302 can create and add a verify message (e.g., ms-trust-level-client=UnVerified) when the computer is locked, indicating that the caller did not have the credentials or means to properly unlock the computer.

This can be used to activate (e.g., show) a caller state indicator 314 (e.g., icon, audio signal) at the callee client 308. For example, if the caller is calling human resources (HR) to talk about the caller's pay, an HR employee can attempt to verify the caller identity if the HR employee sees that the caller client 302 has a lower trust level.

The caller client trust level information 306 can be updated by the caller client 302 (e.g., if the caller has unlocked the caller client 302 during the conversation) by sending the new trust level in re-invites and INFO SIP messages, for example.

Based on the registration trust level information 110 (e.g., ms-trust-level-registrar) and caller client trust level information 306 (e.g., ms-trust-level-client), the callee can decide how much the callee trusts the identity of the caller. For example, if the call is picked up by an auto-attendant callee, the auto-attendant can skip asking the caller to enter credentials if the auto-attendant sees that the caller has a high trust level. Further, the callee client 308 can now expose access to secure application features that were not available when the caller client exhibited a weaker trust mode. For example, if the caller calls HR and an automated agent answers the call, the automated agent can provide options to access and change retirement account contributions if the caller is in a higher trust level. The automated agent can also send call contexts (notes) containing personal information (e.g., salary, retirement date, etc.) based on the options selected.

Another scenario this addresses is when the auto-attendant requests that the caller be more strongly authenticated because the caller client 302 it is in a lower trust level. The auto-attendant can now suggest an additional option of unlocking the computer or desk phone. Moreover, while the caller is in the call, the caller can unlock the desk phone (e.g., via a biometric device in the phone), or for HID devices, unlock the computer (by entering a password in the computer). The caller's IP phone can then send a re-invite or an INFO SIP message with the new verify header (e.g., ms-trust-level-client=verifiedLevelX).

Put another way, the communications security system includes the sign-in component of the caller client for sending caller sign-in credentials for registration to the call communications infrastructure and receiving registration trust level information based on the caller sign-in credentials, the caller client trust component for computing the caller trust level information, and the communications component of the caller client for sending the registration trust level information and the caller trust level information to a callee client. The callee client manages interaction with the caller client based on the registration trust level information and the caller trust level information.

The caller trust level information is sent with the sign-in credentials to the call communications infrastructure for registration, and the registration trust level information computed based on the sign-in credentials and the caller trust level information. The caller client sends the registration trust level information and caller trust level information as SIP messages in combination with an IP call initiated by the caller client to the callee client. The callee client requests access to features of secured applications based on the registration trust level information and the caller trust level information. The caller client trust component creates a verify message that designates access security state of the caller client, recomputes the caller trust level information based on a change in the access security state, and sends updated caller trust level information to the callee client.

Note that although described in the context of using SIP, the disclosed architecture is not restricted so, but can employ other protocol such as XMPP (extensible messaging and presence protocol), H.323, and so on.

Additionally, although described in the context of calls and call clients, the architecture also applies to messaging clients such as for sending only instant messages, and clients capable of both calls and text messaging, for example.

It can also be the case where the far endpoint requests near endpoint trust information rather than the near endpoint pushing the trust information to the far endpoint. This pull approach can also be applied to the registration server such that the server requests the trust information from the near endpoint, rather than the near endpoint pushing it to the registration server. A challenge-response regime can also be applied for these purposes, where the registration server challenges the endpoint. Moreover, the results of the challenge can be sent to the far endpoint. The challenge can also be initiated by the application servers to the far endpoint, which proxies the challenge to the near endpoint or the intermediate communications servers.

Figure 4:
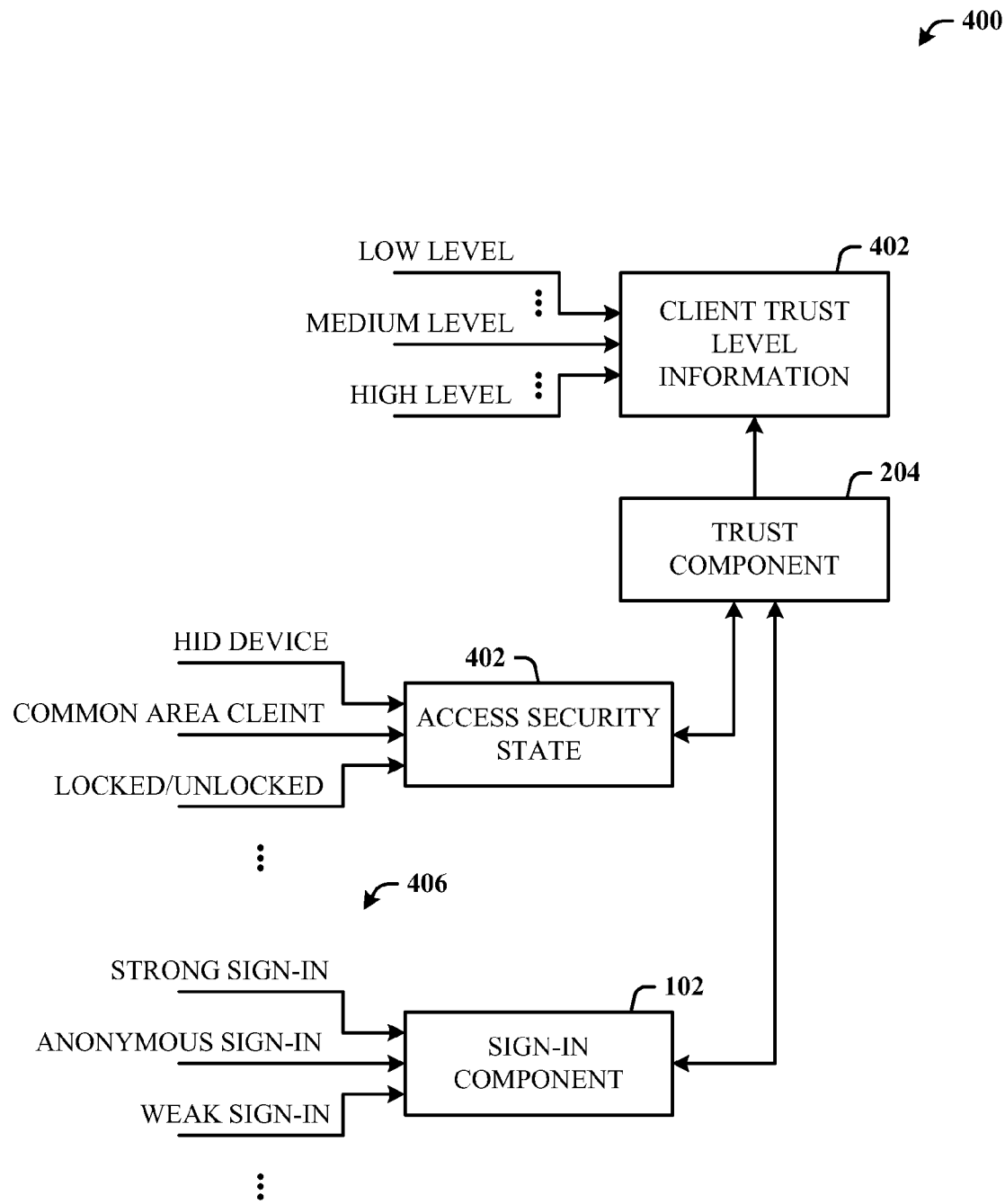
FIG. 4 illustrates a client for processing data to determine client trust level information.

FIG. 4 illustrates a client 400 for processing data to determine client trust level information 402. The client 400 (e.g., caller and/or callee) includes the trust component 204 for receiving information related to access security state 404 and sign-in credentials 406 received by the sign-in component 102. The access security state 404 relates to the use of external HID devices and tethered and/or wireless devices that connect to a computer to facilitate making and receiving calls to callees, if the computer and/or devices are locked or unlocked, and so on. The sign-in credentials 406 relate to the type of sign-in, as described above. For example, the sign-in can be strong, weak, medium, anonymous, etc., with different corresponding levels of client trust (e.g., low, medium, high, etc.) assigned based on the credential used.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
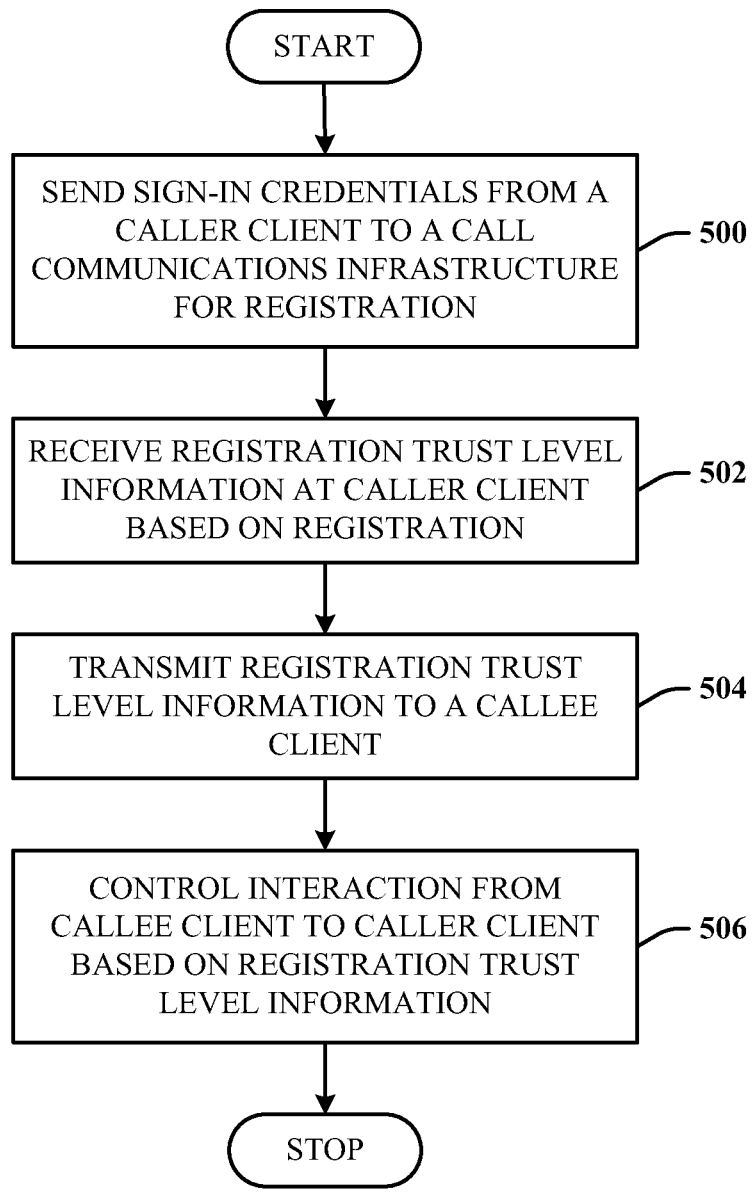
FIG. 5 illustrates a computer-implemented communications security method.

FIG. 5 illustrates a computer-implemented communications security method. At 500, sign-in credentials are sent from a caller client to a call communications infrastructure for registration. At 502, registration trust level information is received at the caller client based on the registration. At 504, the registration trust level information is transmitted to a callee client. At 506, interaction from the callee client to the caller client is controlled (by the callee client) based on the registration trust level information. The call communications infrastructure can be IP-based, and the caller client sends the registration trust level information and the client trust level information in SIP messages to the callee client.

Figure 6:
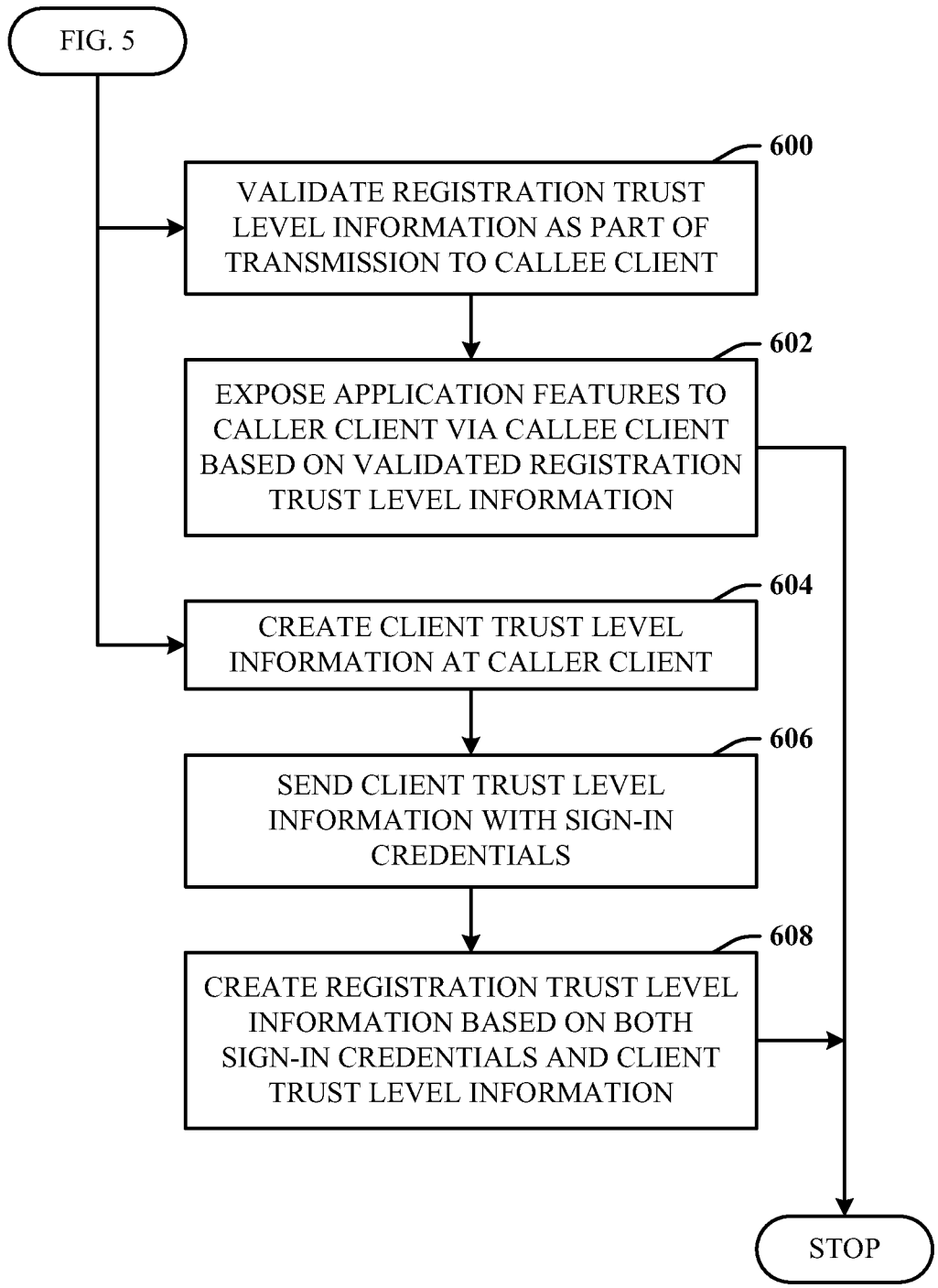
FIG. 6 illustrates additional aspects of the method of FIG. 5.

FIG. 6 illustrates additional aspects of the method of FIG. 5. At 600, the registration trust level information is validated as part of transmission to the callee client. At 602, application features are exposed to the caller client via the callee client based on the validated registration trust level information. At 604, client trust level information is created at the caller client. At 606, the client trust level information is sent with the sign-in credentials. At 608, the registration trust level information is created based on both the sign-in credentials and the client trust level information.

Figure 7:
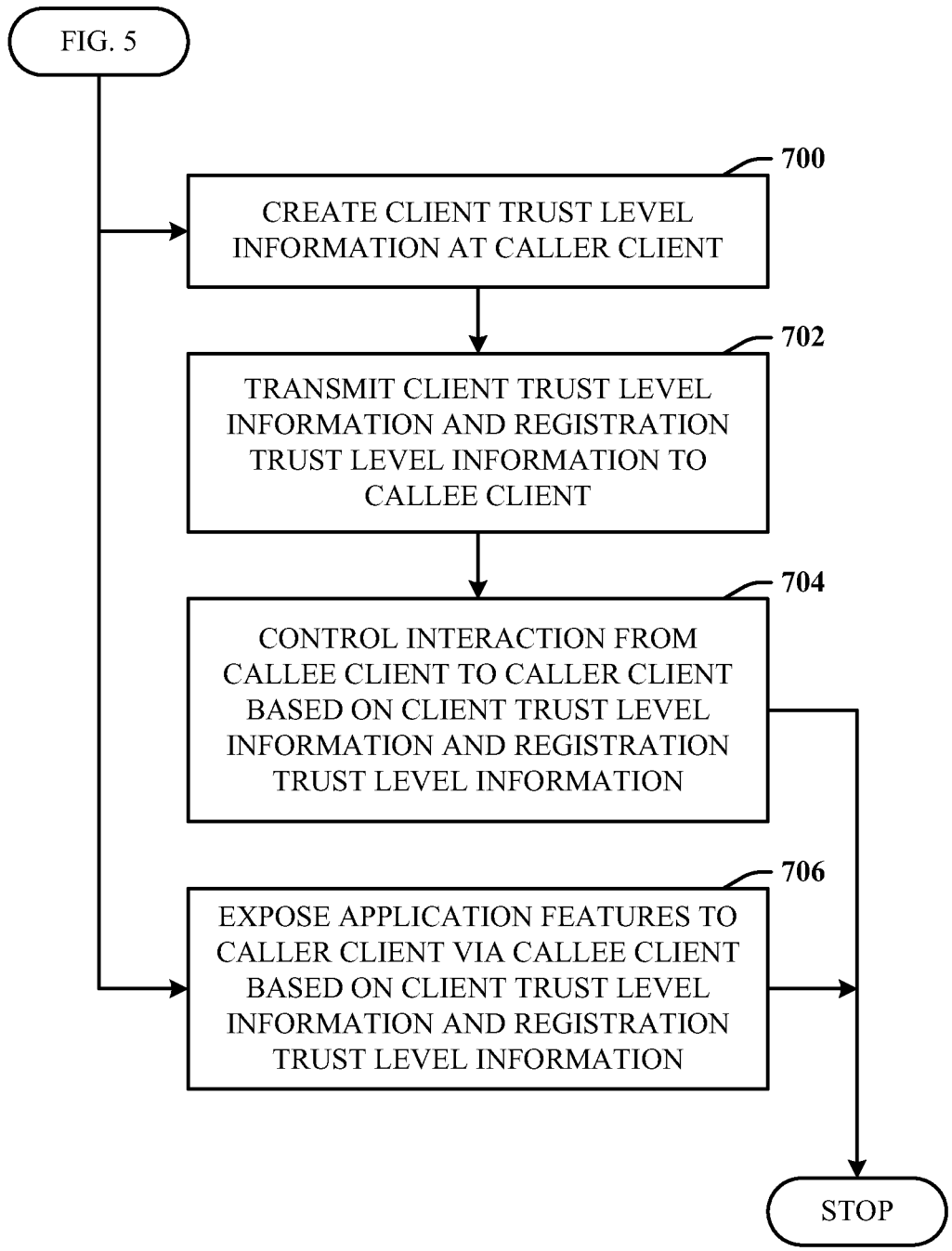
FIG. 7 illustrates further aspects of the method of FIG. 5.

FIG. 7 illustrates additional aspects of the method of FIG. 5. At 700, client trust level information is created at the caller client. At 702, the client trust level information and the registration trust level information are transmitted to the callee client. At 704, interaction from the callee client to the caller client is controlled (e.g., by the callee client) based on the client trust level information and the registration trust level information. At 706, the application features are exposed to the caller client via the callee client based on the client trust level information and the registration trust level information.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
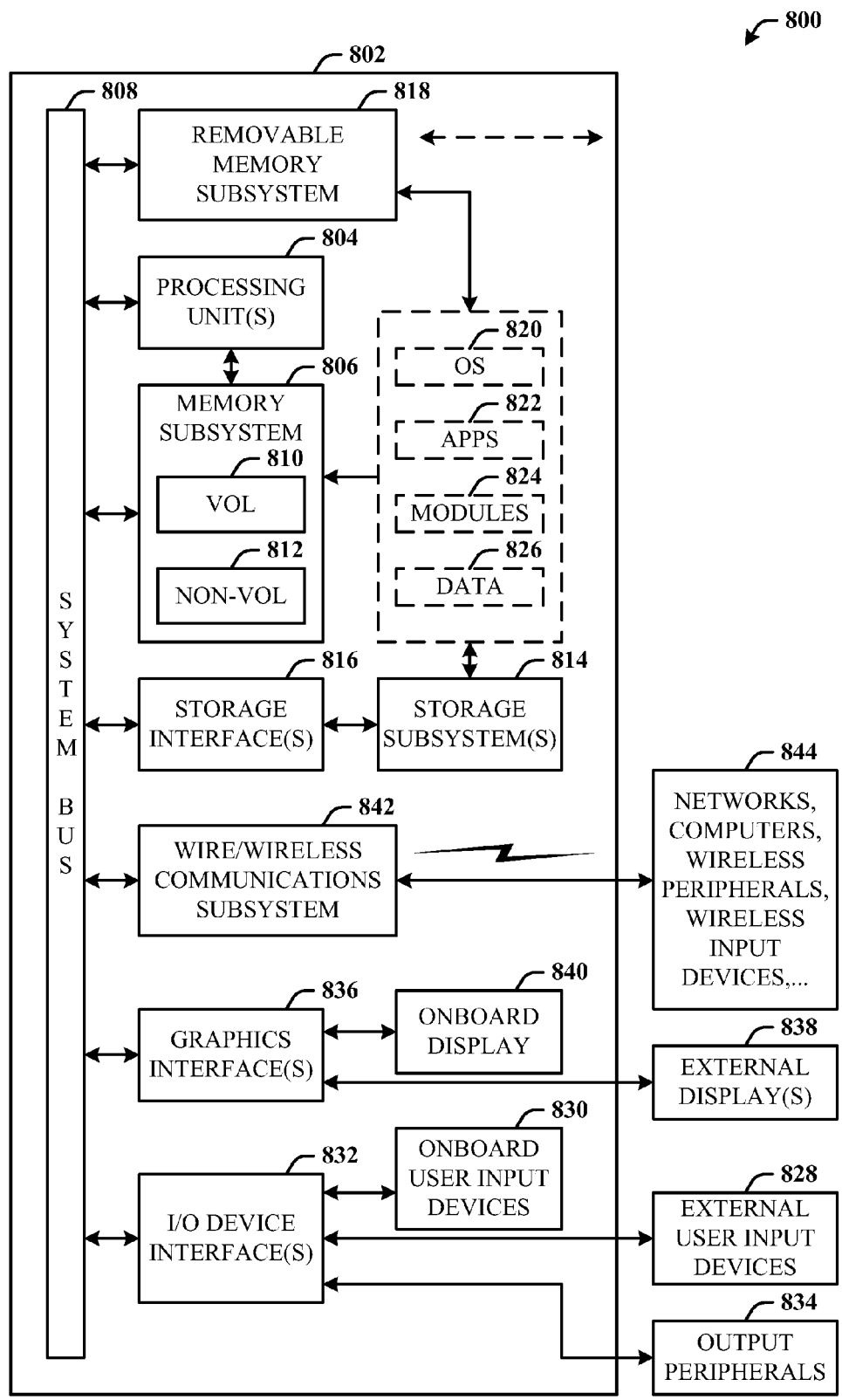
FIG. 8 illustrates a block diagram of a computing system operable to facilitate access to secured application features based on call trust levels.

Referring now to FIG. 8, there is illustrated a block diagram of a computing system 800 operable to facilitate access to secured application features based on call trust levels. In order to provide additional context for various aspects thereof, FIG. 8 and the following discussion are intended to provide a brief, general description of the suitable computing system 800 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 800 for implementing various aspects includes the computer 802 having processing unit(s) 804, a system memory 806, and a system bus 808. The processing unit(s) 804 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 806 can include volatile (VOL) memory 810 (e.g., random access memory (RAM)) and non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the memory subsystem 806 to the processing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes storage subsystem(s) 814 and storage interface(s) 816 for interfacing the storage subsystem(s) 814 to the system bus 808 and other desired computer components. The storage subsystem(s) 814 can include one or more of a hard disk drive (HDD), a magnetic floppy disk drive (FDD), and/or optical disk storage drive (e.g., a CD-ROM drive DVD drive), for example. The storage interface(s) 816 can include interface technologies such as EIDE, ATA, SATA, and IEEE 1394, for example.

One or more programs and data can be stored in the memory subsystem 806, a removable memory subsystem 818 (e.g., flash drive form factor technology), and/or the storage subsystem(s) 814 (e.g., optical, magnetic, solid state), including an operating system 820, one or more application programs 822, other program modules 824, and program data 826.

The one or more application programs 822, other program modules 824, and program data 826 can include the entities, components and functionality described for the system 100 of FIG. 1, the entities, components and functionality described for the system 200 of FIG. 2, the entities, components and functionality described for the diagram 300 of FIG. 3, the entities, components and functionality described for the client 400 of FIG. 4, and the methods represented in the flow charts of FIGS. 5-7, for example.

Generally, programs include routines, methods, data structures, other software components, etc., that perform particular tasks or implement particular abstract data types. All or portions of the operating system 820, applications 822, modules 824, and/or data 826 can also be cached in memory such as the volatile memory 810, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so forth. Computer readable media can be any available media that can be accessed by the computer 802 and includes volatile and non-volatile media, removable and non-removable media. For the computer 802, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 802, programs, and data using external user input devices 828 such as a keyboard and a mouse. Other external user input devices 828 can include a microphone, an IR (infrared) remote control, a joystick, a game pad, camera recognition systems, a stylus pen, touch screen, gesture systems (e.g., eye movement, head movement, etc.), and/or the like. The user can interact with the computer 802, programs, and data using onboard user input devices 830 such a touchpad, microphone, keyboard, etc., where the computer 802 is a portable computer, for example. These and other input devices are connected to the processing unit(s) 804 through input/output (I/O) device interface(s) 832 via the system bus 808, but can be connected by other interfaces such as a parallel port, IEEE 1394 serial port, a game port, a USB port, an IR interface, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP) using logical connections via a wired/wireless communications subsystem 842 to one or more networks and/or other computers. The other computers can include workstations, servers, routers, personal computers, microprocessor-based entertainment appliance, a peer device or other common network node, and typically include many or all of the elements described relative to the computer 802. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wired/wireless communication subsystem 842 (e.g., a network interface adapter, onboard transceiver subsystem, etc.) to communicate with wired/wireless networks, wired/wireless printers, wired/wireless input devices 844, and so on. The computer 802 can include a modem or has other means for establishing communications over the network. In a networked environment, programs and data relative to the computer 802 can be stored in the remote memory/storage device, as is associated with a distributed system. It will be appreciated that the network connections shown are exemplary and other means of establishing a communications link between the computers can be used.

The computer 802 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 9:
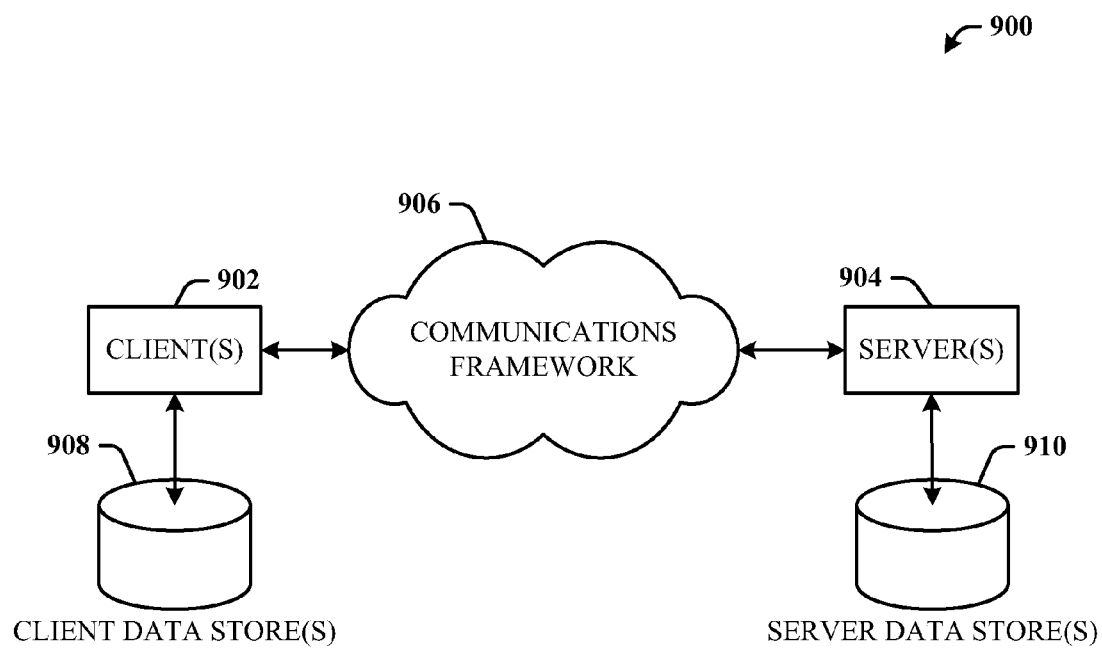
FIG. 9 illustrates a schematic block diagram of a computing environment that facilitates access control to application features using client trust levels.

Referring now to FIG. 9, there is illustrated a schematic block diagram of a computing environment 900 that facilitates access control to application features using client trust levels. The environment 900 includes one or more client(s) 902. The client(s) 902 can be hardware and/or software (e.g., threads, processes, computing devices). The client(s) 902 can house cookie(s) and/or associated contextual information, for example.

The environment 900 also includes one or more server(s) 904. The server(s) 904 can also be hardware and/or software (e.g., threads, processes, computing devices). The servers 904 can house threads to perform transformations by employing the architecture, for example. One possible communication between a client 902 and a server 904 can be in the form of a data packet adapted to be transmitted between two or more computer processes. The data packet may include a cookie and/or associated contextual information, for example. The environment 900 includes a communication framework 906 (e.g., a global communication network such as the Internet) that can be employed to facilitate communications between the client(s) 902 and the server(s) 904.

Communications can be facilitated via a wire (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented communications security system, comprising:
    a caller client device that computes caller client device trust level information of the caller client device;
    a registration server that receives registration sign-in credentials from the caller client device and the caller client device trust level information, and determines registration trust level information based on the registration sign-in credentials and the caller client device trust level information; and
    a callee client device that receives from the caller client device, the registration trust level information and the caller client device trust level information, the callee client device managing communicative interaction with the caller client based on the registration trust level information,
    wherein the callee client device requests access to features of secured applications based on the registration trust level information and the computed caller client device trust level information received from the caller client device, and
    wherein the caller client device creates a verify message designating an access security state of the caller client device, and recomputes the caller client device trust level information based on a change to the access security state of the caller client device and sends the recomputed caller client device trust level information to the callee client device.

2. The system of claim 1, wherein the caller client device sends the registration trust level information in combination with a call initiated by the caller client device to the callee client device.

3. The system of claim 2, wherein the registration server is IP-based, and the caller client device sends the registration trust level information as session initiation protocol (SIP) messages in combination with an IP call via the IP based registration server to the callee client device.

4. The system of claim 1, wherein the caller client device sends the recomputed caller client device trust level information to the callee client device.

5. The system of claim 1, wherein the caller client device creates the verify message that designates verification results verifying the caller client device trust level information of the caller client device to the callee client device.

6. The system of claim 1, wherein the registration trust level information is signed by a registration server computer as part of the registration to the registration server computer.

7. The system of claim 1, wherein the caller client device receives suggestions as to actions to take that result in a different level of the registration trust level information.

8. A computer-implemented communications security system, comprising:
    a caller client device that computes caller client device trust level information of the caller client device;
    a registration server that receives registration sign-in credentials from the caller client device and the caller client device trust level information, and computes registration trust level information based on the registration sign-in credentials and caller client device trust level information, and
    a callee client device that receives from the caller client device, the registration trust level information and the caller client device trust level information;
    wherein the callee client requests access to features of secured applications based on the registration trust level information and the computed caller client device trust level information, and
    wherein the caller client recomputes the caller client device trust level information based on a change to the access security state, and sends the recomputed caller client device trust level information to the callee.

9. The system of claim 8, wherein the caller client device trust level information is sent with the registration sign-in credentials to the call registration server for registration, the registration trust level information computed based on the registration sign-in credentials and the caller client device trust level information.

10. The system of claim 8, wherein the caller client sends the registration trust level information and caller client device trust level information as SIP messages in combination with an IP call initiated by the caller client to the callee client.

11. The system of claim 8, wherein the caller client sends the recomputed caller client device trust level information to the callee client.

12. A computer-implemented communications security method, comprising:
    creating the caller client trust level information at the caller client;
    sending sign-in credentials and the caller client trust level information from the caller client to a call communications infrastructure comprising a registration server for registration;
    registering the caller client with the registration server using the sign-in credentials;
    creating the registration trust level information based on both the sign in credentials and the caller client trust level information;
    receiving registration trust level information at the caller client based on the registration;
    transmitting the registration trust level information and the caller client trust level information to a callee client;
    controlling interaction from the callee client to the caller client based on the registration trust level information;
    validating an access security state of the caller client by the caller client and recomputing caller client trust level information of the caller client based on a change to an access security state of the caller client;
    sending the recomputed caller client trust level information to the callee client; and
    exposing application features to the caller client via the callee client based on the recomputed caller client trust level information of the caller client.

13. The method of claim 12, wherein the call communications infrastructure is IP-based, and the caller client sends the registration trust level information and the caller client trust level information in SIP messages to the callee client.

14. The method of claim 12, further comprising:
    controlling interaction from the callee client to the caller client based on the caller client trust level information and the registration trust level information.

15. The method of claim 14, further comprising exposing application features to the caller client via the callee client based on the caller client trust level information and the registration trust level information.

* * * * *